United States Patent Office 3,251,871
Patented May 17, 1966

3,251,871
PROCESS FOR THE ISOLATION OF PURE, WATER-SOLUBLE ALKYL TIN TRIHALIDES
Christoph Dörfelt, Burghausen, Oberbayern, Germany, assignor to Farbwerke Hoechst Aktiengesellschaft vormals Meister Lucius & Brüning, Frankfurt am Main, Germany, a corporation of Germany
No Drawing. Filed Nov. 13, 1962, Ser. No. 237,373
Claims priority, application Germany, Nov. 15, 1961, F 35,362
3 Claims. (Cl. 260—429.7)

Alkyl tin trichlorides of the general formula $RSnCl_3$, in which R represents an aliphatic hydrocarbon radical, can be prepared according to various known methods. For example, alkyl magnesium chloride or tetra-alkyl tin can be reacted with tin tetrachloride. According to British Patent No. 739,883 alkyl tin trichlorides are obtained in particularly good yields when mixing equimolar quantities of tetra-alkyl tin and tin tetrachloride, in which process equal molar quantities of trialkyl tin chloride and alkyl tin trichloride are formed. This reaction is carried out at a low temperature, advantageously below 20° C., since otherwise, the afore-mentioned reaction products continue to react with each other forming dialkyl tin dichloride. Such a reaction partially occurs during the separation by distillation of alkyl tin trichloride and trialkyl tin chloride as a result of the necessarily elevated temperatures employed. The aforesaid British patent, therefore, suggests to perform the distillation in a vacuum which is as high as possible, since in this case the temperature can be kept low. Particularly on the industrial scale the loss of alkyl tin trichloride, caused by the formation of dichloride, cannot be avoided, since the reaction mixture in the big apparatus is for a longer period exposed to a higher temperature.

The preparation of a completely pure alkyl tin trichloride by disillation, said compound being free from trialkyl tin chloride and dialkyl tin dichloride, is also rendered complicated by the fact that the boiling points of the two compounds are relatively close together so that distillation is to be performed in a rather high column and under strong reflux. These measures, however, require a raising of the temperature or a prolongation of the time of stay of the reaction mixture in the hot parts of the apparatus, thus favoring the formation of dialkyl tin dichloride at the expense of alkyl tin trichloride.

Now I have found that pure, water-soluble alkyl tin trihalides of the formula $RSnX_3$ in which R represents a saturated or unsaturated aliphatic hydrocarbon radical containing from 1 to 8 carbon atoms and X represents halogen, can be isolated from mixtures containing water-insoluble compounds by extracting said alkyl tin trihalide from said mixtures with water and then separating it from the aqueous solution by fractional distillation.

The alkyl tin trihalides with alkyl radicals containing up to about 8 carbon atoms are—as well as tin tetrachloride—readily soluble in water, whereas the corresponding trialkyl tin halides and dialkyl tin dihalides are practically water-insoluble. The compounds used in the process of the present invention must—to a certain degree—be water-soluble. Those alkyl tin trihalides which are sparingly or not at all soluble in water cannot be separated according to the process of the present invention. According to the process of the present invention those alkyl tin trifluorides, -chlorides, -bromides and -iodides, advantageously the chlorides and bromides can be isolated, the alkyl radical of which contains 1 to 8, advantageously 1 to 6 carbon atoms.

As examples for alkyl tin trihalides which can be obtained in a practically pure form according to the present invention there may be mentioned: methyl tin trichloride, methyl tin tribromide, ethyl tin trichloride, ethyl tin tribromide, propyl tin trichloride, propyl tin tribromide, isopropyl tin trichloride, isopropyl tin tribromide, n-butyl-tin trichloride, n-butyl tin tribromide, isobutyl tin trichloride, isobutyl tin tribromide, tert. butyl-tin trichloride, tert. butyl tin tribromide, n-pentyl-tin trichloride, n-pentyl-tin tribromide, isoamyl tin trichloride, isoamyl tin tribromide, n-hexyl-tin trichloride, n-hexyl-tin tribromide, n-heptyl-tin trichloride, n-heptyl-tin tribromide, n-octyl-tin trichloride, n-octyl-tin tribromide, 2-ethyl-hexyl-tin trichloride, 2-ethyl-hexyl-tin tribromide, vinyl tin trichloride, vinyl tin tribromide, allyl tin trichloride and allyl tin tribromide. The mixtures preferred for the use in the process of the present invention can be prepared, for example, according to British Patent No. 739,883. The pure alkyl tin trihalides are obtained by distillation from their aqueous solutions in a nearly quantitative yield. This effect is new and also surprising, since, one distilling aqueous solutions of the chemically related tin tetrachloride which show a mineral acid reaction due to hydrolysis, there occurs a separation in hydrochloric acid which distils over and stannic acid which remains in the distilling vessel (cf. Holleman-Wiberg, "Lehrbuch der anorganischen Chemie," 34th–36th edition, 1955, page 355; Gmelin-Kraut, "Handbuch der anorganischen Chemie," 7th edition, volume IV, 1, page 315). Also the aqueous extraction solutions of alkyl tin trihalides obtained according to the process of the invention show a mineral acid reaction and are therefore split by hydrolysis into hydrogen halide and alkyl stannic acid. It is therefore completely surprising that, on distilling the above-mentioned solutions according to the process of the invention, no separation in hydrogen halide and alkyl stannic acid occurs, but that first water, which shows a neutral reaction, and subsequently alkyl tin trihalide in a nearly quantitative yield can be distilled off.

It is a particular advantage of the process of the invention that very pure alkyl tin trihalides, which are free from toxic dialkyl tin dihalides and trialkyl tin halides, can be obtained according to it. According to the new process there are obtained alkyl tin trihalides which do not contain toxic ingredients and which are, therefore, particularly suitable as starting material for the preparation of further non-toxic organo-tin compounds. The products of the present invention can, for example, be used according to the process of U.S. Patent No. 3,021,302 for the manufacture of alkyl thiostannonic acids which are used as stabilizers for polyvinyl chloride (cf. British Patent No. 890,283).

The process of the invention can be employed whenever alkyl-tin trihalides, which are more or less water-soluble, particularly those containing up to 8 carbon atoms in the alkyl radical, have to be separated from a mixture containing water-insoluble substances; it is particularly suitable for the separation of alkyl tin trichlorides from mixtures containing trialkyl tin chlorides and dialkyl tin dichlorides, obtained for example by reacting alkyl magnesium chloride or tetra-alkyl tin with tin tetrachloride.

The following examples serve to illustrate the invention, but they are not intended to limit it thereto:

*Example 1*

346.7 grams of pure tetra-n-butyl tin were slowly mixed at 5–10° C. in a glass flask, while stirring, with 260.7 grams of tin tetrachloride, and stirring was continued for a further 30 minutes at the same temperature. The liquid reaction mixture thus obtained was extracted in several portions with a total quantity of 170 cc. of water by shaking it out in a separating funnel. The weight of the united aqueous extracts amounted to 450 grams. First the water was distilled off under normal pressure over a small column with dephlegmator, and then the butyl tin trichloride was removed by distillation under a pressure of 10 mm. of mercury.

There were obtained 267 grams of pure n-butyl-tin trichloride boiling at 98–99° C. (under a pressure of 10 mm. of mercury), in which dibutyl tin dichloride and tributyl tin chloride could no longer be detected by analysis. Yield 94.6% of the theory. The water-insoluble part of the reaction mixture consisted of practically pure tributyl tin chloride (content of chlorine 10.6%, theory 10.92%) and had a weight of 316 grams, i.e. 97.2% of the theoretical yield.

On mixing the so obtained pure butyl tin trichloride with the equal volume of water, a clear solution showing mineral acid reaction was formed with heating, from which butyl tin trichloride could be recovered in a nearly quantitative yield by distillation in the afore-described manner after water, which showed a neutral reaction, had previously been passed through.

When dispensing with the extraction by water and instead of it distilling the reaction mixture, which was obtained from tetrabutyl tin and tin tetrachloride, under a pressure of 10 mm. of mercury in the above-described apparatus, there were obtained only 221 g. of butyl tin trichloride after 2 fractional distillations, i.e. 78.3% of the theory. The so obtained product became turbid when being diluted with water and still contained 2% of dibutyl tin dichloride. The distillation residue also contained dibutyl-tin dichloride.

*Example 2*

199.5 grams of pure tetra-ethyl tin were introduced into a glass flask, 222 grams of tin tetrachloride were caused to run gradually into it at 0° C. while stirring, and stirring was continued for a further hour at the same temperature. The reaction mixture so obtained was extracted by shaking with 80 cc. of water and it was separated in a separating funnel; the non-aqueous phase was again shaken out with 40 cc. of water. The united aqueous extracts were then fractionated over a small column with dephlegmator. After pure water had previously been passed through, 195 grams of ethyl-tin trichloride passed over at 72–73° C. under a pressure of 10 mm. of mercury. Theoretical yield: 90.2%.

*Example 3*

91.7 grams of tetra-n-hexyl tin were cooled in a glass flask at 5° C., 52.1 grams of tin tetrachloride were dropwise added at 5–10° C. while stirring, and stirring was continued for a further 30 minutes at the same temperature. The reaction mixture was extracted by shaking with 50 cc. of water and the aqueous phase was separated in a separating funnel. It was fractionated over a small column with dephlegmator. After the water had been distilled off, 51 grams of n-hexyl-tin trichloride passed over at 127–128° C. under a pressure of 11 mm. of mercury. Theoretical yield 82.2°. The compound has not yet been described in the relevant literature.

*Analysis.*—Calculated for $C_6H_{13}SnCl_3$: Sn, 38.27%; Cl, 34.33%. Found: Sn, 38.4%; Cl, 34.3%.

*Example 4*

173.4 grams of tetrabutyl tin were mixed in a glass flask at 35–40° C. with 219.1 grams of tin tetrabromide. After the reaction heat had decayed, stirring was continued for a further 2 hours at room temperature, and the reaction mixture was extracted in several portions with a total quantity of 600 cc. of water. The aqueous extracts were united and distilled in vacuo. After the water had been separated by distillation, pure butyl-tin tribromide passed over at 128–129° C. under a pressure of 12 mm. of mercury. The yield amounted to 184 grams, which corresponds to 88.7% of the theory. The compound has not been known in the relevant literature.

*Analysis.*—Calculated for $C_4H_9SnBr_3$: Sn, 28.57%; Br, 57.70%. Found: Sn, 28.24%; Br, 57.30%.

By distilling the water-insoluble part, 162 grams of tributyl tin bromide (boiling point 161–162° C. under a pressure of 12 mm. of mercury) were obtained as by-product. Theoretical yield 87.7%.

*Example 5*

79.4 kilograms of pure tetrabutyl tin were introduced into an enameled vessel with cooling jacket and armature stirrer, 59.7 kilograms of tin tetrachloride were caused to run into it while stirring and cooling at 15–20° C., and the addition of tin tetrachloride being terminated, stirring was continued for a further hour at the same temperature. The reaction mixture was extracted in several portions with 40 liters of water, the aqueous extracts were united and fractionated in an apparatus consisting of glass. After the water had been distilled off, 61.8 kilograms of pure butyl tin trichloride passed over at 102–103° C. under a pressure of 12 mm. of mercury. Theoretical yield 95.7%. The product was clearly soluble in water and was free from dibutyl-tin dichloride and tributyl tin chloride.

The water-insoluble part of the reaction mixture consisted of nearly pure tributyl tin chloride (content of chlorine 11.0%, theory 10.9%). Yield 73 kilograms, i.e., 98% of the theory.

I claim:
1. A method of isolating pure, water-soluble alkyl tin trihalides of the formula

$$RSnX_3$$

wherein R represents an aliphatic hydrocarbon radical containing from 1 to 8 carbon atoms and X stands for a halogen atom from their mixtures with water-insoluble compounds, which comprises extracting said alkyl tin trihalides from said mixtures with water and recovering the alkyl tin trihalides from the resulting aqueous extract by fractional distillation.
2. The method of claim 1 wherein X is chlorine.
3. The method of claim 1 wherein X is bromine.

References Cited by the Examiner
UNITED STATES PATENTS 2,569,492 10/1951 Passino et al. _____ 260—429.7
2,675,399 4/1954 Ramsden et al. ____ 260—429.7

FOREIGN PATENTS 739,883 11/1955 Great Britain.

OTHER REFERENCES

Ingham et al.: Chemical Reviews, vol. 60, No. 5, October 1960, p. 486.

TOBIAS E. LEVOW, *Primary Examiner.*

E. C. BARTLETT, *Examiner.*

F. R. OWENS, *Assistant Examiner.*